US012793977B2

(12) United States Patent
Cao et al.

(10) Patent No.: US 12,793,977 B2
(45) Date of Patent: Nov. 10, 2026

(54) HIGH-SAFETY TERNARY POSITIVE ELECTRODE MATERIAL AND METHOD FOR PREPARING SAME

(71) Applicants: REPT BATTERO Energy Co., Ltd., Wenzhou (CN); Shanghai Ruipu Energy Co., Ltd., Shanghai (CN)

(72) Inventors: Hui Cao, Wenzhou (CN); Yi Yao, Shanghai (CN); Min Hou, Shanghai (CN); Chan Liu, Shanghai (CN); Yingying Guo, Shanghai (CN); Dandan Chen, Shanghai (CN)

(73) Assignees: REPT BATTERO Energy Co., Ltd., Wenzhou (CN); Shanghai Ruipu Energy Co., Ltd., Shanghai (CN)

( * ) Notice: Subject to any disclaimer, the term of this patent is extended or adjusted under 35 U.S.C. 154(b) by 645 days.

(21) Appl. No.: 18/199,157

(22) Filed: May 18, 2023

(65) Prior Publication Data

US 2024/0105933 A1 Mar. 28, 2024

(30) Foreign Application Priority Data

May 19, 2022 (CN) ......................... 202210541442.1

(51) Int. Cl.
*H01M 4/525* (2010.01)
*C01G 53/00* (2025.01)
(Continued)

(52) U.S. Cl.
CPC .......... *H01M 4/525* (2013.01); *C01G 53/504* (2025.01); *C01G 53/506* (2025.01); *H01M 4/131* (2013.01);
(Continued)

(58) Field of Classification Search
CPC ...... H01M 4/525; H01M 4/131; H01M 4/505; H01M 10/0525; H01M 2004/021;
(Continued)

(56) References Cited

U.S. PATENT DOCUMENTS

| | | | | |
|---|---|---|---|---|
| 2011/0033750 | A1 | 2/2011 | Hosokawa et al. | |
| 2016/0156030 | A1* | 6/2016 | Sun | C01G 53/44 429/231.95 |

(Continued)

FOREIGN PATENT DOCUMENTS

| | | | |
|---|---|---|---|
| CN | 101223660 | A | 7/2008 |
| CN | 103606674 | A | 2/2014 |

(Continued)

OTHER PUBLICATIONS

CN 108023078 MT (Year: 2018).*

(Continued)

*Primary Examiner* — Alexander Usyatinsky
(74) *Attorney, Agent, or Firm* — Quarles & Brady LLP

(57) ABSTRACT

The present disclosure discloses a high-safety ternary positive electrode material and a method for preparing the same; wherein the ternary positive electrode material has a chemical composition of $Li_a(Ni_xCo_yMn_{1-x-y})_{1-b}MbO_{2-c}A_c$, wherein $0.75 \le a \le 1.2$, $0.75 \le x < 1$, $0 < y \le 0.15$, $1-x-y > 0$, $0 \le b \le 0.01$, $0 \le c \le 0.2$, M is one or more selected from the group consisting of Al, Zr, Ti, Y, Sr, W and Mg, and A is one or more selected from the group consisting of S, F and N; and $C_{Mn}-(1-x-y) \ge 0.07$; $C_{Co-y} \ge 0.05$; $0 \le [C_{Mn}-(1-x-y)]/(C_{Co}-y) \le 2.0$. The ternary positive electrode material of the present disclosure is a high-nickel single crystal material with gradient concentration; it has the advantages of high capacity and high thermal stability, and the preparation method is simple, and is suitable for large-scale production.

12 Claims, 1 Drawing Sheet

(51) Int. Cl.

| | |
|---|---|
| ***C01G 53/504*** | (2025.01) |
| ***C01G 53/506*** | (2025.01) |
| ***H01M 4/131*** | (2010.01) |
| ***H01M 4/505*** | (2010.01) |
| ***H01M 10/0525*** | (2010.01) |
| *H01M 4/02* | (2006.01) |

(52) U.S. Cl.
CPC ....... *H01M 4/505* (2013.01); *H01M 10/0525* (2013.01); *C01P 2004/03* (2013.01); *C01P 2006/37* (2013.01); *C01P 2006/40* (2013.01); *H01M 2004/021* (2013.01); *H01M 2004/028* (2013.01)

(58) Field of Classification Search
CPC .............. H01M 2004/028; C01G 53/50; C01P 2004/03; C01P 2006/37; C01P 2006/40
See application file for complete search history.

(56) References Cited

U.S. PATENT DOCUMENTS

| | | | | |
|---|---|---|---|---|
| 2018/0145313 | A1 | 5/2018 | Hwang et al. | |
| 2018/0183046 | A1* | 6/2018 | Jin ...................... | H01M 4/1315 |
| 2022/0013775 | A1 | 1/2022 | Lee et al. | |
| 2022/0185695 | A1 | 6/2022 | Dou et al. | |
| 2023/0234858 | A1* | 7/2023 | Cao ........................ | C01G 53/50 429/231.95 |

FOREIGN PATENT DOCUMENTS

| | | | | | |
|---|---|---|---|---|---|
| CN | 105244490 | A | * | 1/2016 | |
| CN | 106505195 | A | | 3/2017 | |
| CN | 108023078 | A | * | 5/2018 | ............ H01M 4/505 |
| CN | 109786730 | A | | 5/2019 | |
| CN | 110518220 | A | | 11/2019 | |
| CN | 111646523 | A | | 9/2020 | |
| CN | 112103496 | A | | 12/2020 | |
| CN | 112447951 | A | | 3/2021 | |
| CN | 114122385 | A | | 3/2022 | |
| CN | 114639824 | A | | 6/2022 | |
| EP | 3910709 | A1 | | 11/2021 | |
| JP | H0950810 | A | | 2/1997 | |
| JP | 2004348981 | A | | 12/2004 | |
| JP | 2014506388 | A | | 3/2014 | |
| JP | 2018515884 | A | | 6/2018 | |
| JP | 2019530630 | A | | 10/2019 | |
| JP | 2020514972 | A | | 5/2020 | |
| JP | 2020537315 | A | | 12/2020 | |
| JP | 2021509220 | A | | 3/2021 | |
| KR | 20160066812 | A | | 6/2016 | |
| WO | 2019163846 | A1 | | 8/2019 | |

OTHER PUBLICATIONS

The decision of JPO to grant a Patent for Application JP 2023083285 (Year: 2025).*

The Notification of SIPO to grant a Patent for Application CN.202210541442 (Year: 2022).*

Fan et al., Research Progress on Cathode Materials for High Energy Density Lithium Ion Batteries, Energy Storage Science and Technology, 2018, 7(4):607-617.

Ju et al., The Full Gradient Design in Li-Rich Cathode for High Performance Lithium Ion Batteries with Reduced Voltage Decay, Journal of Power Sources, 2019, 437:226902, pp. 1-9.

Lin et al., Hierarchical Nickel Valence Gradient Stabilizes High-Nickel Content Layered Cathode Materials, Nature Communications, 2021, 12:2350, pp. 1-10.

The State Intellectual Property Office of People's Republic of China, First Office Action and Search Report, Application No. 202210541442.1, Jul. 5, 2022, 17 pages.

The State Intellectual Property Office of People's Republic of China, Supplementary Search, Application No. 202210541442.1, Jul. 22, 2022, 3 pages [No English Language Translation Available].

Song et al., A novel low-cobalt long-life LiNi0.88Co0.06Mn0.03AI0.03O2 cathode material for lithium ion batteries, Chemical Engineering Journal, 2020, 407:126301, pp. 1-10.

Zhang et al., Improving the single crystal LiNi0.8Co0.1Mn0.1O2 cathode material performance by fluorine doping, Ceramics International, 2021, 47(23):33843-33852.

European Patent Office, Extended European Search Report, Application No. 23275080.2, Nov. 8, 2023, 8 pages.

Japanese Patent Office, Notice of Reasons for Refusal, Application No. 2023-083285, Aug. 5, 2024, 7 pages.

PCT International Search Report, PCT/CN2023/093836, Jun. 23, 2023, 5 pages.

Intellectual Property India, Examination Report, Application No. 202417087589, Aug. 11, 2026, 7 pages.

* cited by examiner

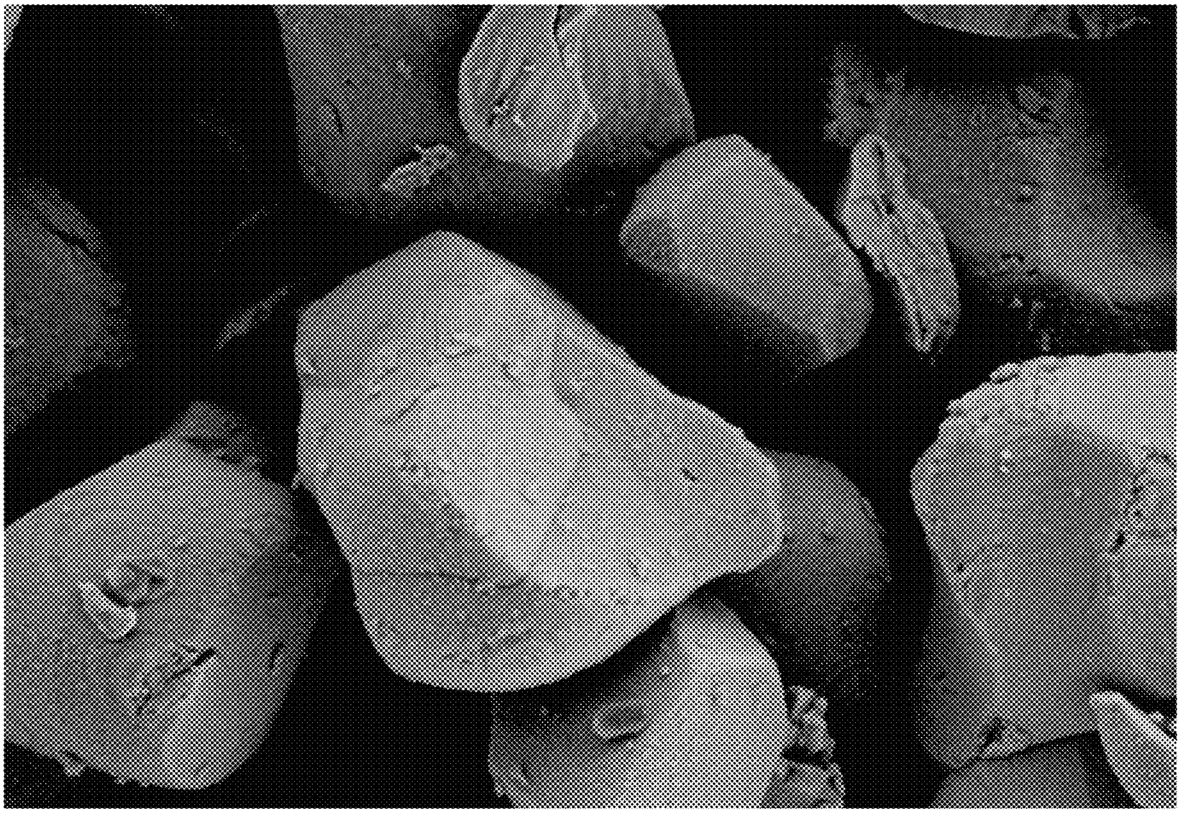

HIGH-SAFETY TERNARY POSITIVE ELECTRODE MATERIAL AND METHOD FOR PREPARING SAME

CROSS-REFERENCE TO RELATED APPLICATION

This application claims priority to Chinese Application No. 202210541442.1 filed May 19, 2022, the disclosure of which is incorporated herein by reference in its entirety and for all purposes.

TECHNICAL FIELD

The disclosure belongs to the technical field of batteries, and relates to a battery positive electrode material, particularly a high-safety ternary positive electrode material and a method for preparing the same.

BACKGROUND TECHNOLOGY

Ternary positive electrode materials with α-NaFeO2 structure have high specific capacity and excellent kinetic performance, and are suitable as positive electrode materials for power batteries for high-performance electric vehicles and energy storage and other fields.

In the ternary positive electrode materials, Ni element changes in valence state during charging/discharging, which is a major contributor to capacity and energy. Co element helps to improve kinetic performances and structural stability of the material. Mn/Al elements can increase the oxygen release temperature of the material, thereby improving thermal stability of the positive electrode material.

In order to obtain higher battery energy density, a Ni content in the ternary material can be increased. However, this approach will lead to a reduction in a ratio of Co/Mn elements in the material. A reduction of tetravalent Mn in a transition metal layer means a reduction of divalent Ni, and in order to maintain the charge balance in a crystal structure, a proportion of trivalent ions in the Ni element increases. This directly affects the stability of the material. When the material is in a highly delithiated state, oxygen release is more likely to occur, which poses a safety hazard to use of batteries.

A contradiction between material specific capacity and thermal stability can be resolved by constructing gradient concentration positive electrode materials. *Nat Commun* 12, 2350 (2021) provides a method for coating a surface of high-nickel materials with a middle/low-nickel cladding layer to create high-nickel polycrystalline materials with high capacity and stability. However, this method requires fine control at the precursor stage of material synthesis and is not suitable for large-scale production. In addition, this method can only be used to prepare polycrystalline ternary positive electrode materials, and cannot be extended to single crystal materials, because precursors with gradient concentrations will lose concentration differences due to solid-phase diffusion of metal ions during high-temperature sintering.

SUMMARY OF THE INVENTION

In allusion to the above problems, one object of the present disclosure is to provide a high-safety ternary positive electrode material and a method for preparing the same. The material is a high-nickel single crystal material with a gradient concentration, and it has the advantages of high capacity and high thermal stability, and the method is simple and suitable for mass production.

The object of the present disclosure is fulfilled by the following technical solutions:

A First Aspect

The present disclosure provides a ternary positive electrode material for a lithium ion battery, wherein the ternary positive electrode material has a chemical composition of $Li_a(Ni_xCo_yMn_{1-x-y})_{1-b}MbO_{2-c}A_c$, wherein $0.75 \le a \le 1.2$, $0.75 \le x < 1$, $0 < y \le 0.15$, $1-x-y > 0$, $0 \le b \le 0.01$, $0 \le c \le 0.2$, M is one or more selected from the group consisting of Al, Zr, Ti, Y, Sr, W and Mg, and A is one or more selected from the group consisting of S, F and N;

the ternary positive electrode material has a single crystal morphology, and $C_{Mn}-(1-x-y) \ge 0.07$, wherein $C_{Mn}$ is an atomic ratio of Mn element to a sum of three elements of Ni, Co, and Mn obtained by using XPS to test a surface of the material;

$C_{Co}-y \ge 0.05$, wherein $C_{Co}$ is an atomic ratio of Co element to the sum of three elements of Ni, Co, and Mn obtained by using XPS to test the surface of the material;

$$0 \le [C_{Mn} - (1-x-y)]/(C_{Co} - y) \le 2.0.$$

In the present disclosure, $C_{Mn}-(1-x-y) \ge 0.07$, wherein $C_{Mn}$ is the atomic ratio of Mn element obtained by using XPS to test the surface of the material to the sum of three elements of Ni, Co, and Mn obtained by using XPS to test the surface of the material;

$C_{Co}-y \ge 0.05$, wherein $C_{Co}$ is the atomic ratio of Co element obtained by using XPS to test the surface of the material to the sum of three elements of Ni, Co, and Mn obtained by using XPS to test the surface of the material.

In one or more embodiments, $C_{Mn}-(1-x-y) \le 0.40$.

In one or more embodiments, $C_{Co}-y \le 0.35$.

In one or more embodiments, $C_{Mn}-(1-x-y) \ge 0.15$.

In one or more embodiments, $C_{Co}-y \ge 0.1$.

Proportions of Ni, Co, and Mn elements on a surface of conventional high-nickel ternary cathode materials are the same as those in a bulk phase, and a Ni content is relatively high. Valence states of the elements change during the charging and discharging process of a lithium-ion battery, especially when the battery is fully charged, $Ni^{2+}/Ni^{3+}$ are converted into high-valence $Ni^{4+}$, which is more likely to have side reactions with solvents and additives in an electrolyte, resulting in adverse consequences such as battery performance degradation and gas production.

In the present disclosure, the proportion of Mn element among the three main metal elements on the surface of the high-nickel positive electrode material is increased by ≥7% compared with that in the whole, and at the same time, Co element is increased by ≥5%, so that the content of Ni element on the surface of the material is reduced by equal to or more than 12%. On the basis of maintaining high specific capacity and excellent kinetic performances of high-nickel materials, gas production under high-temperature storage conditions and capacity fading during high-temperature cycling can be significantly reduced. By further increasing the differences between the proportions of Mn element and Co element on the surface and those in the whole to ≥15% and ≥10%, respectively, a high-nickel ternary positive electrode material with better kinetic performances and thermal stability can be obtained.

In one or more embodiments, when a cumulative particle volume distribution of the ternary cathode material reaches 50%, the corresponding particle size $D_v50$ satisfies 2.5 μm≤$D_v50$≤55 μm. When the particle size of the material is lower than this range, the overall particle size is too small, and the material has problems of low compaction and too large active surface area, which are not conducive to obtaining a lithium ion battery with high energy density; while the particle size of the material is higher than this range, too large particle size will prolong the solid-phase diffusion distance of lithium ions, resulting in poor kinetic performances.

A Second Aspect

The present disclosure provides a method for preparing the ternary positive electrode material for a lithium ion battery, wherein the method comprises the following steps:

- step S1: selecting a ternary positive electrode precursor containing Ni, Co, and Mn and mixing it with lithium hydroxide to form a mixture A;
- step S2: heating the mixture A in an air or oxygen atmosphere, wherein the mixture A is held at 700~1,100° C. for 4~15 hours, followed by rolling and pulverization to obtain an intermediate product B; if the sintering temperature of this process is lower than 700° C., it will be difficult for the precursor to completely transform into a ternary positive electrode material with a layered structure; if the sintering temperature is higher than 1,100° C., a large amount of $Ni^{2+}$ in a transition metal layer will exchange with $Li^+$ in a lithium ion layer in the high-nickel material, and serious mixed arrangement will occur in the material, resulting in a decrease in the specific capacity of the material;
- step S3: mixing the intermediate product B with a Mn-containing solid powder and a Co-containing solid powder to form a mixture C, wherein a molar ratio of Mn element in the Mn-containing solid powder to the intermediate product B is 0.5~4%, and a molar ratio of Co element in the Co-containing solid powder to the intermediate product B is 2~4%;
- step S4: heating the mixture C in an air or oxygen atmosphere, wherein the mixture C is held at 700~1,100° C. for 4~15 hours, followed by rolling and pulverization to obtain the ternary positive electrode material for a lithium ion battery.

In one or more embodiments, in step S1, the ternary positive electrode precursor containing Ni, Co, and Mn is a ternary hydroxide precursor.

In one or more embodiments, in step S1, the preparation of the ternary positive electrode precursor containing Ni, Co, and Mn is as follows: preparing three metal salts of nickel sulfate, cobalt sulfate, and manganese sulfate with set proportions into an aqueous solution with a total concentration of the metal salts of 1.5~4 mol/L; adding a mixed aqueous solution of sodium hydroxide and ammonia water as precipitants therein, wherein in the mixed aqueous solution, a NaOH concentration is 3~4.5 mol/L, a $NH_4OH$ concentration is 2~3.5 mol/L, a molar ratio of NaOH to a sum of three metal salts is 2:1~2.5:1, and a molar ratio of $NH_4OH$ to the sum of three metal salts is 1:1~2:1; reacting under a protective atmosphere (such as nitrogen), with a reaction temperature controlled to be constant at 45~60° C., a reaction pH value of 10~12, and a stirring speed of 900~1,200 r/min; after reacting for 9~15 hours, washing and drying in vacuum at 75~90° C. for 10~30 hours to obtain the ternary hydroxide precursor.

In one or more embodiments, in step S1, the preparation of the ternary positive electrode precursor containing Ni, Co, and Mn is as follows: preparing three metal salts of nickel sulfate, cobalt sulfate, and manganese sulfate with set proportions into a 2 mol/L solution; adding a mixed solution of sodium hydroxide (a concentration of 4 mol/L, and a molar ratio of NaOH to a sum of three metal salts of 2:1) and ammonia water (a concentration of 2.4 mol/L, and a molar ratio of $NH_4OH$ to a sum of three metal salts of 1.2:1) as precipitants therein; reacting under a protective atmosphere (nitrogen), with a reaction temperature controlled to be constant at 55° C.±1° C., a reaction pH value of 11.0, and a stirring speed of 1,000 r/min; after reacting for 12 hours, washing and drying in vacuum at 80° C. for 24 hours to obtain the ternary hydroxide precursor.

In one or more embodiments, in step S2, the mixture A is heated in an oxygen atmosphere.

In one or more embodiments, an oxide of element M may be added as a dopant in step S1, or may not be added.

In one or more embodiments, an oxide of element M may be added as a coating agent in step S3, or may not be added.

In one or more embodiments, an element A-containing compound may be added as a dopant in step S1, or may not be added.

In one or more embodiments, an element A-containing compound may be added as a coating agent in step S3, or may not be added.

In one or more embodiments, an oxide of element A may be added as a dopant in step S1, or may not be added.

In one or more embodiments, an oxide of element A may be added as a coating agent in step S3, or may not be added.

In one or more embodiments, in step S3, the Mn-containing solid powder is one or more of $MnO_2$, $Mn_2O_3$, MnO(OH), and MnO. The use of these Mn-containing solid powders is beneficial to the formation of Li—Co—Mn—O compounds with a layered structure on the surface of single crystal materials.

In one or more embodiments, the Co-containing solid powder is one or more selected from the group consisting of $Co_3O_4$, CoO, $Co(OH)_2$, CoOOH and $CoCO_3$. The use of these Co-containing solid powders is beneficial to the formation of Li—Co—Mn—O compounds with a layered structure on the surface of single crystal materials.

In one or more embodiments, in step S3, a molar ratio of Mn element to Co element in the Mn-containing solid powder and the Co-containing solid powder is 1:4~1:1.

A Third Aspect

A positive electrode sheet for lithium ion batteries using the aforementioned ternary positive electrode material or using the ternary positive electrode material prepared by the aforementioned method falls within the protection scope of the present disclosure.

A positive electrode sheet for a lithium ion battery comprising the aforementioned ternary positive electrode material or comprising the ternary positive electrode material prepared by the aforementioned method falls within the protection scope of the present disclosure.

A Forth Aspect

A lithium ion battery using the aforementioned positive electrode sheet also falls within the protection scope of the present disclosure.

A lithium ion battery comprising the aforementioned positive electrode sheet also falls within the protection scope of the present disclosure.

Compared with the prior art, the present disclosure has the following beneficial effects:

1) The content of Ni in the main elements (Ni, Co, and Mn) in the ternary positive electrode material of the present disclosure is higher than 75%, resulting in a relatively high specific capacity (materials with a Ni content higher than 75% have relatively poor stability, which need to be surface treated by the method of the present disclosure). At the same time, the material has a single crystal morphology, and the aggregation of multiple crystal grains is rare. Compared with polycrystalline materials, the possibility of generating inter-crystalline gaps during charging and discharging is significantly reduced, resulting in excellent cycle stability.

2) The proportion of Mn element on the surface of the ternary positive electrode material of the present disclosure is higher than that in the whole by equal to or more than 0.07, which can effectively improve the stability of the material at high temperature. The increase in the proportion of tetravalent Mn ions will increase the potential of the H2-H3 phase transition of the material, which will reduce the irreversible change of the material during charging and discharging. When the positive electrode is heated, the electrolyte may react with the active oxygen released by the positive electrode to cause thermal runaway, and this process starts from the surface of the positive electrode material. Therefore, this design of the material can significantly improve the ability of the battery to cope with thermal runaway.

3) The proportion of Co element on the surface of the ternary positive electrode material of the present disclosure is higher than that in the whole by equal to or more than 0.05, which can improve the kinetic performances of the material. The cobalt-containing oxide/hydroxide can react with the residual lithium salt on the surface of the material to form a composite metal lithium oxide, thereby reducing the amount of free lithium on the surface of the material and reducing the gas production of the material at high temperature.

4) In the ternary positive electrode material of the present disclosure, Mn and Co compounds are used to co-coat the high-nickel positive electrode material to realize the preparation of a single crystal material with high-Co/Mn on the surface and high-Ni in the core. Single Co coating can improve the kinetic performances of the material and reduce the residual alkali on the surface, but it cannot improve the stability of the material. Single Mn coating cannot build a layered structure on the surface of the material, and it is more likely to form lithium manganate when it reacts with free lithium, which will form a lattice mismatch with the main body of the material and reduce the specific capacity and kinetic performances of the material. Coating with Co and Mn at the same time and maintaining the ratio of the two in the coating layer to meet $[C_{Mn}-(1-x-y)]/(C_{Co}-y)\leq 2.0$ can construct a surface structure of positive electrode materials with good kinetic performances and stability at the same time.

5) The particle size of the ternary positive electrode material of the present disclosure preferably ranges from 2.5 μm to 5 μm when the cumulative volume distribution reaches 50%. In this instance, the exposed active specific surface area of the material is moderate, neither will the lithium ion transport path in the solid be too long because the particles are too large, nor will the surface structure deteriorate rapidly because the particles are too small.

6) The sintering method used in the ternary positive electrode material of the present disclosure includes conventional mixing and sintering processes. It should be noted that Mn-containing compounds and Co-containing compounds need to be added in advance and mixed uniformly during secondary sintering. The ratio of the two needs to be controlled at 1:4~1:1, otherwise it may not be possible to form a Li—Co—Mn—O compound with a layered structure on the surface of the single crystal material, so that the effect described in the present disclosure, that is to improve the thermal stability of the material without causing significant adverse effects on the specific capacity and kinetic performances of the material, cannot be achieved.

7) The positive electrode sheet and lithium ion battery made by using the positive electrode material of the present disclosure have higher thermal stability, and their stability in long-term cycle is also more excellent.

BRIEF DESCRIPTION OF THE DRAWINGS

Other characteristics, objects and advantages of the present disclosure will become more apparent by reading the detailed description of non-limiting embodiments made with reference to the following drawings:

FIG. 1 is an SEM image of a single crystal high-nickel positive electrode material prepared according to Example 2.

DETAILED DESCRIPTION

The present disclosure will be illustrated in detail with reference to the following Examples. The following Examples will help those skilled in the art to further understand the present disclosure, but do not limit the present disclosure in any way. It should be noted that, for those skilled in the art, adjustments and improvements can be made without departing from the concept of the present disclosure. They all fall within the protection scope of the present disclosure.

Example 1

This example relates to a ternary positive electrode material for lithium ion batteries, whose theoretical chemical composition is $Li_{1.02}Ni_{0.805}Co_{0.127}Mn_{0.068}O_2$. The preparation steps are as follows:

1) Preparation of a ternary positive electrode precursor containing Ni, Co, and Mn: first, three metal salts of nickel sulfate, cobalt sulfate, and manganese sulfate were prepared into a 2 mol/L solution at a molar ratio of 83:11:6. A peristaltic pump was used to slowly pump a mixed solution of sodium hydroxide (4 mol/L) and ammonia water (2.4 mol/L) as precipitants into a reaction kettle containing the above metal salt solution at a volume ratio of 1:1. The reaction temperature was strictly controlled at 55° C.±1° C. The reaction pH was 11.0, and the stirring speed was 1,000 r/min. Nitrogen was used as a protective gas during the reaction. After reacting for 12 hours, the material obtained by the reaction was washed several times with deionized water, and dried in vacuum at 80° C. for 24 hours to obtain a ternary hydroxide precursor;

2) The ternary positive electrode precursor containing Ni, Co, and Mn were fully mixed with lithium hydroxide at a molar ratio of lithium hydroxide:precursor of 1.05:1 to form a mixture A;

3) The mixture A was heated in an oxygen atmosphere and held at 910° C. for 9 hours. An intermediate product B was obtained after rolling and pulverization.

4) The intermediate product B was fully mixed with MnO(OH) and $Co(OH)_2$ to form a mixture C, wherein the molar ratio of MnO(OH) to the intermediate product B was 0.7%, the molar ratio of $Co(OH)_2$ to the intermediate product B was 2.1%, and the molar ratio of the two is 1:3;

5) The mixture A was heated in an oxygen atmosphere and held at 820° C. for 5 hours. The ternary positive electrode material for lithium ion batteries was obtained after rolling and pulverization.

Subsequent Examples and Comparative Examples follow a similar process, and the difference lies in the ratio selection of precursors, the temperature/time selections in step 3) and step 5), etc., which are listed in Tables 1 and 2.

Example 2

The material preparation process was basically the same as that in Example 1, and only the ratios related to MnO(OH) and $Co(OH)_2$ in step 4) were adjusted to 1.0% and 2.0%. The theoretical chemical composition of the finally obtained material is $Li_{1.02}Ni_{0.806}Co_{0.123}Mn_{0.071}O_2$. The SEM image of the prepared single crystal high-nickel positive electrode material is shown in FIG. 1.

Example 3

The material preparation process was basically the same as that in Example 1, and only the ratios related to MnO(OH) and $Co(OH)_2$ in step 4) were adjusted to 3.5% and 4.0%. The theoretical chemical composition of the finally obtained material is $Li_{1.03}Ni_{0.764}Co_{0.135}Mn_{0.101}O_2$.

Example 4

The material preparation process was basically the same as that in Example 1. The molar ratio of three metal salts of nickel sulfate, manganese sulfate and cobalt sulfate in step 1) was adjusted to 90:5:5. The heating temperature in step 3) was adjusted to 890° C. The MnO(OH) in step 4) was adjusted to $MnO_2$. The $Co(OH)_2$ in step 4) was adjusted to COOH. The molar ratio of $MnO_2$ to the intermediate product B was 1.5%, and the molar ratio of CoOOH to the intermediate product B was 2.5%. The heating temperature in step 5) was adjusted to 800° C. The theoretical chemical composition of the finally obtained material is $Li_{1.03}Ni_{0.856}Co_{0.076}Mn_{0.068}O_2$.

Example 5

The material preparation process was basically the same as that in Example 4, and the molar ratios related to $MnO_2$ and CoOOH in step 4) were adjusted to 3.0% and 3.5%. The theoretical chemical composition of the finally obtained material is $Li_{1.02}Ni_{0.833}Co_{0.084}Mn_{0.083}O_2$.

Example 6

The material preparation process was basically the same as that in Example 5, and the step 2) was adjusted to adding $ZrO_2$ as a dopant with a molar ratio of $ZrO_2$ to the precursor of 0.2% during the operation. The theoretical chemical composition of the finally obtained material is $Li_{1.02}Ni_{0.830}Co_{0.087}Mn_{0.081}Zr_{0.002}O_2$, i.e., $Li_{1.02}(Ni_{0.832}Co_{0.087}Mn_{0.081})_{0.998}Zr_{0.002}O_2$.

Comparative Example 1

The material preparation process was basically the same as that in Example 1, and MnO(OH) and $Co(OH)_2$ were not added in step 4). The theoretical chemical composition of the finally obtained material is $Li_{1.04}Ni_{0.830}Co_{0.108}Mn_{0.062}O_2$.

Comparative Example 2

The material preparation process was basically the same as that in Example 1, and the ratios related to MnO(OH) and $Co(OH)_2$ in step 4) were adjusted to 0.4% and 2.4%. The theoretical chemical composition of the finally obtained material is $Li_{1.02}Ni_{0.801}Co_{0.132}Mn_{0.067}O_2$.

Comparative Example 3

The material preparation process was basically the same as that in Example 1, and the ratios related to MnO(OH) and $Co(OH)_2$ in step 4) were adjusted to 1.0% and 0.7%. The theoretical chemical composition of the finally obtained material is $Li_{1.03}Ni_{0.813}Co_{0.114}Mn_{0.073}O_2$.

Comparative Example 4

The material preparation process was basically the same as that in Example 2, and the MnO(OH) and $Co(OH)_2$ in step 4) were adjusted to $MnSO_4$ and $CoSO_4$ respectively. The theoretical chemical composition of the finally obtained material is $Li_{1.02}Ni_{0.800}Co_{0.125}Mn_{0.075}O_2$.

Material Characterization

Particle size test: the sample was dispersed in water and added to a laser particle size analyzer for testing. The particle refractive index was set to 1.741, the absorbance was set to 1, and the solvent refractive index was set to 1.330. The internal ultrasound of the test instrument was turned on during the test, and the shading degree was set to 10~20%. The volume distribution differential curve was selected and $D_v50$ was read by software.

ICP test: 0.4 g of a positive electrode material sample was weighed and put in a 250 ml beaker to which 10 ml HCl solution (1:1 by volume of HCl: $H_2O$) was added. The sample was dissolved by heating at 180° C. The heated liquid was transferred to a volumetric flask, and pure water was added to its constant volume. The liquid was diluted to a measurable range, and tested using an ICP instrument. The x and y values were calculated by comparing the relative contents of the Ni, Co, and Mn elements determined by the ICP test, and a, b, and c were determined by ICP directly. If M and A each included more than one element, b and c each were equal to a sum of the contents of different elements.

XPS test: a positive electrode material powder sample was spread on an aluminum foil to which a double-sided adhesive tape was adhered. The sample was flattened using a tablet press, and then the material was tested using an XPS instrument. In the test process, a full-spectrum scan can be performed first to determine possible elements, and then a narrow-spectrum scan was performed for the existing elements. The relative atomic content of each element was calculated based on the area of the signal peak in view of the sensitivity factor of the element.

The above-mentioned particle size, ICP, and XPS tests were performed on the ternary positive electrode materials pulverized in step (5) of the Examples and Comparative Examples, and the results are shown in Table 2.

TABLE 1

| | Sulfate molar ratio Ni:Co:Mn | LiOH:precursor | Heating temperature and time in step 3) | Mn-containing coating agent and its ratio | Co-containing coating agent and its ratio |
|---|---|---|---|---|---|
| Example 1 | 83:11:6 | 1.05:1 | 910° C./9 h | MnO(OH)/0.7% | $Co(OH)_2$/2.1% |
| Example 2 | 83:11:6 | 1.05:1 | 910° C./9 h | MnO(OH)/1.0% | $Co(OH)_2$/2.0% |
| Example 3 | 83:11:6 | 1.05:1 | 910° C./9 h | MnO(OH)/3.5% | $Co(OH)_2$/4.0% |
| Example 4 | 90:5:5 | 1.05:1 | 890° C./9 h | $MnO_2$/1.5% | CoOOH/2.5% |
| Example 5 | 90:5:5 | 1.05:1 | 890° C./9 h | $MnO_2$/3.0% | CoOOH/3.5% |
| Example 6 | 90:5:5 | 1.05:1 | 890° C./9 h | $MnO_2$/3.0% | CoOOH/3.5% |
| Comparative Example 1 | 83:11:6 | 1.05:1 | 910° C./9 h | — | — |
| Comparative Example 2 | 83:11:6 | 1.05:1 | 910° C./9 h | MnO(OH)/0.4% | $Co(OH)_2$/2.4% |
| Comparative Example 3 | 83:11:6 | 1.05:1 | 910° C./9 h | MnO(OH)/1.0% | $Co(OH)_2$/0.7% |
| Comparative Example 4 | 83:11:6 | 1.05:1 | 910° C./9 h | $MnSO_4$/1.0% | $CoSO_4$/2.0% |

No surface treatment was performed in Comparative Example 1, and none of $C_{Mn}-(1-x-y)\geq 0.07$, $C_{Co}-y\geq 0.05$, and $0\leq[C_{Mn}-(1-x-y)]/(C_{Co}-y)\leq 2.0$ are met. In Comparative Example 2, the amount of Mn coating reagent is too small, and the requirement of $C_{Mn}-(1-x-y)\geq 0.07$ as well as the requirement of 1:4-1:1 in the process are not met. In Comparative Example 3, the amount of Co coating reagent is too small, and the requirements of $C_{Co}-y\geq 0.05$ and $[C_{Mn}-(1-x-y)]/(C_{Co}-y)\leq 2.0$, as well as the requirement of 1:4-1:1 in the process are not met. In Comparative Example 4, $MnSO_4$ was used, it is difficult to form a layered structure, a large amount remains on the surface, and $[C_{Mn}-(1-x-y)]/(C_{Co}-y)\leq 2.0$ is not met.

TABLE 2

| | Heating temperature and time in step 5) | Particle size after pulverization in step 5) | Ni:Co:Mn in the material measured by ICP | Ni:Co:Mn on the surface measured by XPS |
|---|---|---|---|---|
| Example 1 | 820° C./5 h | 3.68 μm | 80.5:12.7:6.8 | 67.5:18.2:14.3 |
| Example 2 | 820° C./5 h | 3.72 μm | 80.6:12.3:7.1 | 63.7:18.0:18.3 |
| Example 3 | 820° C./5 h | 3.60 μm | 76.2:13.7:10.1 | 50.1:24.6:25.3 |
| Example 4 | 800° C./5 h | 3.55 μm | 85.6:7.6:6.8 | 65.7:17.2:17.1 |
| Example 5 | 800° C./5 h | 3.58 μm | 83.3:8.4:8.3 | 56.4:19.2:24.4 |
| Example 6 | 800° C./5 h | 3.47 μm | 83.1:8.8:8.1 | 55.9:19.5:24.6 |
| Comparative Example 1 | 820° C./5 h | 3.57 μm | 83.0:11.8:6.2 | 83.1:11.6:6.3 |
| Comparative Example 2 | 820° C./5 h | 3.63 μm | 80.1:13.2:6.7 | 68.5:19.0:12.5 |
| Comparative Example 3 | 820° C./5 h | 3.62 μm | 81.3:11.4:7.3 | 68.7:13.2:18.1 |
| Comparative Example 4 | 820° C./5 h | 3.75 μm | 80.0:12.5:7.5 | 63.7:15.1:19.5 |

By comparing Examples 1-3 and 4-5, it can be found that as the amount of the coating agent used increases, Co and Mn on the surface of the material will increase. By investigating Example 2 and Comparative Example 4, it will be found that if an appropriate coating agent is not used, the Li—Co—Mn—O layered structure coating layer cannot be formed under the same conditions, which may cause Mn element enrichment on the surface.

Performance Testing

The following method was adopted to make the ternary positive electrode material of Examples and Comparative Examples into battery and test their performance:

A positive electrode active material (prepared ternary positive electrode material) was mixed with carbon black as a conductive agent and polyvinylidene fluoride (PVDF) as a binder at a mass ratio of 97:1.7:1.3, added into N-methyl pyrrolidone (NMIP) as an organic solvent, and stirred at high speed to form a uniform dispersion. After the high-speed stirring was completed, negative pressure defoaming was carried out in the stirring tank to obtain a positive electrode slurry suitable for coating. The obtained positive electrode slurry was coated on an aluminum foil with a transfer coating machine. After drying, cold pressing, and slitting, a positive electrode sheet in a desired shape was made. During the cold pressing process, the compacted density of the coating area of the positive electrode active material was controlled at 3.4 $g/cm^3$.

Graphite as a negative electrode active was mixed with carbon black as a conductive agent, styrene-butadiene rubber (SBR) as a binder, and carboxymethyl cellulose sodium (CMC-Na) according to a mass ratio of 96.8:1.2:1.2:0.8, added into deionized water, and stirred at a high speed to form a uniform dispersion. After high-speed stirring, negative pressure defoaming was carried out in the stirring tank to obtain a negative electrode slurry suitable for coating. The obtained negative electrode slurry was coated on a copper foil with a transfer coating machine. After drying, cold pressing, and slitting, a negative electrode sheet in a desired shape was made. During the cold pressing process, the compacted density of the coating area of the negative electrode active material was controlled at 1.65 g/$cm^3$.

The positive and negative electrode sheets were placed on two sides of a 9 μm thick PE separator respectively, and rolled up to form a roll core. An uncoated area was reserved and connected to a nickel tab by ultrasonic welding. The roll core was wrapped with an aluminum-plastic film and heat-sealed, and one side was reserved for liquid injection.

13 wt % (based on the total mass of the electrolyte) of $LiPF_6$, 1 wt % (based on the total mass of the electrolyte) of carbonic acid and 2 wt % (based on the total mass of the electrolyte) of DTD were added as a lithium salt and additives into a mixed solvent of EC: EMC: DEC at a mass ratio of 3:5:2 to make an electrolyte. The electrolyte was injected into the aluminum plastic film wrapping the roll core. Lithium ion batteries were obtained by further processes of vacuum packaging, standing and formation.

Rate test: a charging and discharging equipment was used to adjust the SOC state of the battery to 0% at a rate of 0.33 C (that is, 0.33 times the rated capacity of the battery in ampere-hours is set as the current value). The battery was charged with a constant current A of 0.5 C at 25° C. after standing for 30 minutes, and the capacity C1 was recorded during the charging process. 0.33 C discharge to 0% SOC was repeated. After standing for 30 minutes, the battery was charged with a constant current A of 2 C, and the capacity C2 was recorded during the discharge process. C2/C1 was investigated as a comparison index for rate performance.

Thermal stability test: a charging and discharging equipment was used to adjust the SOC state of the battery to 100% at a rate of 0.33 C. The battery was disassembled in a glove box and the positive electrode sheet was taken out. A sample of about 2 mm*2 mm was taken from the coating area of the sheet, weighed in the air to obtain $m_1$, and put into a high-pressure crucible. ¼ $m_1$ of the electrolyte was measured out, dropped into the high-pressure crucible with a pipette gun, and packaged. The test was carried out on a DSC device at a heating rate of 5° C./min. The temperature corresponding to the highest peak point in the curve was taken as a comparison index for thermal stability.

High-temperature gas production test: a charging and discharging equipment was used to adjust the SOC state of the battery to 100% at a rate of 0.33 C. The battery volume V1 was measured and recorded. Then the battery was stored in an oven at a constant temperature of 70° C., and the battery volume V2 was recorded after 72 hours. The volume growth rate V2/V1−1 caused by gas production was investigated as a comparison index for high-temperature gas production.

Cycle life: a charging and discharging equipment was used to cyclically charge and discharge the battery at a rate of 1 C at 45° C. The capacity retention rate at 1,000 cycles was recorded as a comparison index for cycle life.

The performance test results are shown in Table 3.

TABLE 3

| | Rate performance | Thermal stability | Gas production at high temperature | Cycle performance |
|---|---|---|---|---|
| Example 1 | 87.6% | 224.7° C. | 23.6% | 84.2% |
| Example 2 | 86.2% | 227.3° C. | 20.5% | 86.7% |
| Example 3 | 88.4% | 235.1° C. | 17.8% | 90.4% |
| Example 4 | 87.7% | 218.9° C. | 24.1% | 86.3% |
| Example 5 | 87.2% | 225.6° C. | 19.3% | 88.7% |
| Example 6 | 87.4% | 227.3° C. | 18.9% | 89.9% |
| Comparative Example 1 | 85.2% | 214.4° C. | 43.7% | 81.4% |
| Comparative Example 2 | 86.1% | 217.5° C. | 37.6% | 83.5% |
| Comparative Example 3 | 77.4% | 220.2° C. | 45.1% | 84.1% |
| Comparative Example 4 | 75.3% | 218.3° C. | 41.4% | 83.7% |

By comparing Examples 1-3 and Comparative Example 1, it can be found that co-coating the material with Co/Mn within the preferred range of the present disclosure can effectively improve its thermal stability and cycle stability on the basis of maintaining the kinetic performances of the material, and at the same time, it reduces the gas production of materials in high-temperature storage environments. From Examples 4-5, it can be seen that this trend is also applicable to precursors with a Ni content equal to or above 90%. From Example 5 and Example 6, it can be seen that the addition of the doping element Zr in step S1 does not affect the effect of the subsequent co-coating treatment, and the effects of both can be exerted at the same time. The amount of coating agent added in the coating process of Comparative Example 2 is close to that of Example 1, but the amount of Mn-containing coating agent added in Comparative Example 2 is too small to effectively improve the surface stability of the material. In Comparative Example 3, the ratio of the Mn-containing coating agent to the Co-containing coating agent added during the coating process is not appropriate, so that the differences between the contents of Mn and Co elements on the surface of the material and the contents of Mn and Co in the whole do not meet the preferred conditions of the present disclosure, and a Li—Co—Mn—O layer structure coating layer cannot be formed on the surface of the material, making it difficult to exert the effect. The Mn-containing coating agent used in Comparative Example 4 cannot react with the Co-containing coating agent and the residual lithium salt on the surface to form a Li—Co—Mn—O layered structure. Although Mn and Co elements are also enriched on the surface of the material, they not only fail to improve the high temperature stability of the material, but lead to a decrease in the kinetic performances of the material.

Specific embodiments of the present disclosure have been described above. It should be understood that the present disclosure is not limited to the specific embodiments described above, and those skilled in the art may make various changes or modifications within the scope of the claims, which do not affect the essence of the present disclosure.

We claim:

1. A ternary positive electrode material for a lithium ion battery, wherein the ternary positive electrode material has a chemical composition of $Li_a(Ni_xCo_yMn_{1-x-y})_{1-b}M_bO_{2-c}A_c$, wherein $0.75 \leq a \leq 1.2$, $0.75 \leq x < 1$, $0 < y \leq 0.15$, $1-x-y > 0$, $0 \leq b \leq 0.01$, $0 \leq c \leq 0.2$, M is one or more selected from the group consisting of Al, Zr, Ti, Y, Sr, W and Mg, and A is one or more selected from the group consisting of S, F and N; wherein the ternary positive electrode material has a single crystal morphology, and $C_{Mn}-(1-x-y) \geq 0.07$, wherein $C_{Mn}$ is an atomic ratio of Mn element to a sum of three elements of Ni, Co, and Mn obtained by using XPS to test a surface of the material;

$C_{Co}-y \geq 0.05$, wherein $C_{Co}$ is an atomic ratio of Co element to the sum of three elements of Ni, Co, and Mn obtained by using XPS to test the surface of the material;

$$0 \leq [C_{Mn} - (1 - x - y)]/(C_{Co} - y) \leq 2.0.$$

2. The ternary positive electrode material for a lithium ion battery according to claim 1, wherein $C_{Mn}-(1-x-y) \geq 0.15$.

3. The ternary positive electrode material for a lithium ion battery according to claim 1, wherein $C_{Co}-y \geq 0.1$.

4. The ternary positive electrode material for a lithium ion battery according to claim 1, wherein when a cumulative particle volume distribution of the ternary positive electrode material reaches 50%, the corresponding particle size $D_v50$ satisfies $2.5\ \mu m \leq D_v50 \leq 5\ \mu m$.

5. A method for preparing the ternary positive electrode material for a lithium ion battery of claim 1, wherein the method comprises the following steps:

step S1: selecting a ternary positive electrode precursor containing Ni, Co, and Mn and mixing it with lithium hydroxide to form a mixture A;

step S2: heating the mixture A in an air or oxygen atmosphere, wherein the mixture A is held at 700~1,100° C. for 4~15 hours, followed by rolling and pulverization to obtain an intermediate product B;

step S3: mixing the intermediate product B with a Mn-containing solid powder and a Co-containing solid powder to form a mixture C, wherein a molar ratio of Mn element in the Mn-containing solid powder to the intermediate product B is 0.5~4%, and a molar ratio of Co element in the Co-containing solid powder to the intermediate product B is 2~4%;

step S4: heating the mixture C in an air or oxygen atmosphere, wherein the mixture Cis held at 700~1,100° C. for 4~15 hours, followed by rolling and pulverization to obtain the ternary positive electrode material for a lithium ion battery.

6. The method for preparing the ternary positive electrode material for a lithium ion battery according to claim 5, wherein an oxide of element M is added as a dopant in step S1; and/or an oxide of element M is added as a coating agent in step S3; and/or an element A-containing compound is added as a dopant in step S1; and/or an element A-containing compound is added as a coating agent in step S3.

7. The method for preparing the ternary positive electrode material for a lithium ion battery according to claim 5, wherein the Mn-containing solid powder is one or more of $MnO_2$, $Mn_2O_3$, MnO(OH), and MnO; and the Co-containing solid powder is one or more of $Co_3O_4$, CoO, $Co(OH)_2$, CoOOH, and $CoCO_3$.

8. The method for preparing the ternary positive electrode material for a lithium ion battery according to claim 5, wherein a molar ratio of Mn element to Co element in the Mn-containing solid powder and the Co-containing solid powder is 1:4~1:1 in step S3.

9. A positive electrode sheet for a lithium ion battery comprising the ternary positive electrode material of claim 1.

10. A lithium ion battery comprising the positive electrode sheet of claim 9.

11. A positive electrode sheet for a lithium ion battery comprising the ternary positive electrode material prepared by the method of claim 5.

12. A lithium ion battery comprising the positive electrode sheet of claim 11.

* * * * *